No. 802,862. PATENTED OCT. 24, 1905.
G. HOCHSTRASSER.
DOUBLE ACTING SPRING HINGE.
APPLICATION FILED JULY 5, 1904.
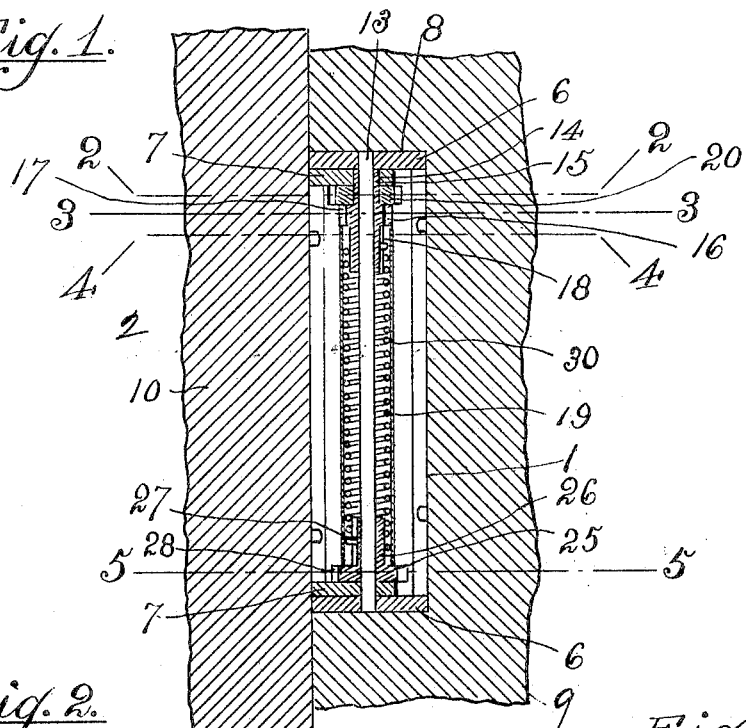
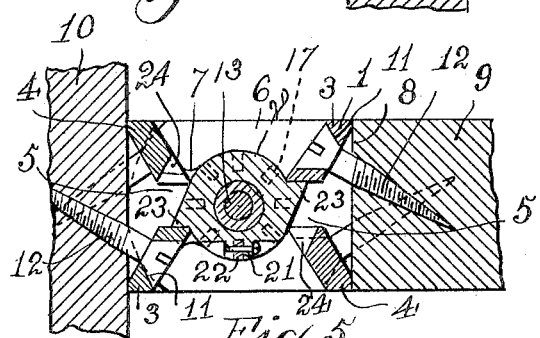
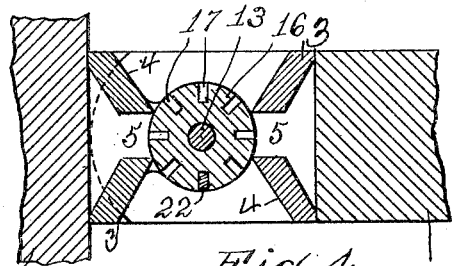
Witnesses:
E. F. Wilson
F. Schlotfeld
Inventor:
Gottlieb Hochstrasser
By Rudolph M. Foy
Attorney

UNITED STATES PATENT OFFICE.

GOTTLIEB HOCHSTRASSER, OF MAYWOOD, ILLINOIS.

DOUBLE-ACTING SPRING-HINGE.

No. 802,862.
Specification of Letters Patent.
Patented Oct. 24, 1905.

Application filed July 5, 1904. Serial No. 215,339.

*To all whom it may concern:*

Be it known that I, GOTTLIEB HOCHSTRASSER, a citizen of the United States, residing at Maywood, in the county of Cook and State of Illinois, have invented certain new and useful Improvements in Double-Acting Spring-Hinges; and I do hereby declare the following to be a full, clear, and exact description of the invention, such as will enable others skilled in the art to which it appertains to make and use the same.

My invention relates to a novel construction in a double-acting spring-hinge, the object being to provide a very simple, efficient, and cheap device of this character; and it consists in the features of construction and combinations of parts hereinafter fully described and claimed.

In the accompanying drawings, illustrating my invention, Figure 1 is a central longitudinal section of a hinge constructed in accordance with my invention. Figs. 2, 3, 4, and 5 are horizontal sections, on an enlarged scale, on the lines 2 2, 3 3, 4 4, and 5 5, respectively, of Fig. 1.

My said hinge consists primarily of two members 1 and 2, each comprising two plates 3 and 4 extending at an incline to each other and having a longitudinal slot 5 between the same, said plates being connected with end plates 6 and 7. Said member 1 is of greater length than said member 2, said member 1 being mounted in a recess 8 in the door 9 and the member 2 secured to the door-jamb 10. In said plates 3 and 4 I provide countersunk openings 11 for screws 12, which pass into the wood at inclines, so as to obtain a good hold therein, the openings in the plates 3 being staggered relatively to the openings in the plates 4. The end plates 6 of the member 1 and the end plates 7 of the member 2, which are adapted to be received within the former, are each provided with substantially central openings to receive the end portions of a vertical shaft 13. The central openings 14 of the upper end plate 7 of the member 2 is enlarged to receive one end of the hub 15 of a wheel 16, provided with peripheral recesses 17, said wheel being mounted on said shaft 13 and the other end of the hub thereof provided with a recess 18, in which one end of a spiral spring 19 is inserted. Rotatively mounted on the upper end of the said hub 15 between said wheel 16 and the end plate 7 is a wheel 20, which is provided with a peripheral recess 21, in which a key-plate 22 is pivotally mounted, the latter being adapted to be inserted at its free end portion in one of the peripheral recesses 17 to hold said wheel 20 against revolution relatively to said wheel 16. Said wheel 20 is also provided at diametrically opposite points with peripheral projections 23, each of which is adapted to engage the inner faces of the plates 3 of the members 1 and 2, the said plates 4 thereof being each provided with a recess 24 in the path of said projections 23 to permit said wheel 20 to turn relatively to each of said members 1 and 2 in one direction. Loosely mounted on the lower end of said shaft 13 is a wheel 25, having a hub 26, provided with a peripheral recess 27, adapted to receive the other end of said spiral spring 19, said wheel 25 being provided at diametrically opposite points with peripheral projections 28, which are disposed in the opposite direction to the projections 23 of the wheel 20 and adapted to engage the inner faces of the plates 4 of the members 1 and 2, the plates 3 thereof being provided with recesses 29 in the path of said projections 28 to permit free passage of the latter in one direction. In order to improve the appearance of said hinge, I prefer to inclose the spring 19 in a tube 30, which abuts at one end against the upper face of the wheel 25 and the lower face of said wheel 16.

The operation of my device is as follows: After the hinge is assembled the wheel 16 is turned in a direction to contract the spring 19, the wheel 20 being held against revolution during this time. As soon as the spring has attained the desired tension and one of the recesses 17 of said wheel 16 is in alinement with the key-plate 22 the latter is dropped into same. While turning said wheel 16 to impart tension to said spring the wheel 25 is held against revolution by the engagement of one of the projections 28 thereof with the edge of the plate 4 of the member 2. As soon as the said wheels 16 and 20 are locked against relative rotation one of the projections 23 of the latter will be thrown by the spring against the edge of the plate 3 of said member 2. The said spring is thus maintained at a given tension by the engagement of one each of said peripheral projections 23 and 28 with the opposing faces of the plates 3 and 4 of the member 2, the other of said peripheral projections engaging the corresponding parts of the member 1, and this serving to hold the door normally midway between the limits of its movement. By turning the door in one direction the wheel 20 will be turned therewith and the wheel 25 will remain stationary, thereby increasing the tension on the spring and causing the latter to return the door to its normal position when released. When said door is swung in the opposite direction, the wheel 20 remains stationary and the wheel 25 is turned.

My said hinge is exceedingly simple, cheap, and efficient and is neat in appearance.

I claim as my invention—

1. In a double-acting hinge, the combination with two leaves provided at their ends with flanges, a shaft journaled in said flanges and forming a pivot on which said leaves turn, a wheel at each end of said shaft provided at diametrically opposite points with peripheral projections, the projections of one wheel being oppositely disposed relatively to the projections of the other thereof, a spring interposed between said wheels and adapted to be maintained at a tension thereby, and two oppositely-disposed stops on each of said leaves located in the path of one each of said oppositely-disposed projections of each wheel, said projections being held in engagement with said stops by the action of said spring and serving to normally hold said leaves between the limits of their relative movements.

2. In a double-acting spring-hinge, the combination with two leaves provided at their ends with relatively overlapping flanges, a shaft journaled in said flanges and pivotally connecting said leaves, a wheel loosely mounted at each end of said shaft and provided with two peripheral projections at diametrically opposite points, two oppositely-disposed stops on each of said leaves located in the path of one projection of each wheel, a spring around said shaft engaging one of said wheels at one end, a wheel connected with said spring at its other end and adapted to be locked with the other of said first-named wheels to impart and maintain tension on said spring, the latter serving to hold said projections in engagement with said stops and thereby normally hold said leaves between the limits of their relative movements.

In testimony whereof I have signed my name in presence of two subscribing witnesses.

GOTTLIEB HOCHSTRASSER.

Witnesses:
 RUDOLPH WM. LOTZ,
 F. SCHLOTFELD.